United States Patent
Purohit et al.

(10) Patent No.: US 10,168,218 B2
(45) Date of Patent: Jan. 1, 2019

(54) PYROELECTRIC IR MOTION SENSOR

(71) Applicant: Google Inc., Mountain View, CA (US)

(72) Inventors: Aveek Ravishekhar Purohit, Mountain View, CA (US); Anurag Gupta, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 339 days.

(21) Appl. No.: 15/057,423

(22) Filed: Mar. 1, 2016

(65) Prior Publication Data

US 2017/0254703 A1    Sep. 7, 2017

(51) Int. Cl.

| | | |
|---|---|---|
| *G01J 5/34* | (2006.01) | |
| *G01J 5/00* | (2006.01) | |
| *G01S 17/02* | (2006.01) | |
| *G01J 5/02* | (2006.01) | |
| *G01J 5/08* | (2006.01) | |

(52) U.S. Cl.
CPC ............ *G01J 5/0025* (2013.01); *G01J 5/0275* (2013.01); *G01J 5/0806* (2013.01); *G01J 5/34* (2013.01); *G01S 17/026* (2013.01)

(58) Field of Classification Search
CPC .... G01J 5/0025; G01J 5/00275; G01J 5/0806; G01J 5/34
USPC ...................................................... 250/338.3
See application file for complete search history.

(56) References Cited

U.S. PATENT DOCUMENTS

| | | |
|---|---|---|
| 7,359,836 B2 | 4/2008 | Wren et al. |
| 8,009,044 B2 | 8/2011 | Shafer et al. |
| 2009/0195382 A1 | 8/2009 | Hall et al. |
| 2013/0053099 A1* | 2/2013 | Nabata ............... G01J 5/047 455/556.1 |
| 2014/0103214 A1* | 4/2014 | Messiou ............ G08B 13/193 250/349 |

FOREIGN PATENT DOCUMENTS

WO       2015132272 A1    9/2015

\* cited by examiner

*Primary Examiner* — David Porta
*Assistant Examiner* — Meenakshi Sahu
(74) *Attorney, Agent, or Firm* — Morris & Kamlay LLP

(57) ABSTRACT

Methods and apparatus relating to a pyroelectric IR (PIR) motion sensor are provided. The provided PIR motion sensor can be used to determine an angular position of a moving person relative to the PIR motion sensor. The provided PIR motion sensor can be used to determine a proximity of a moving person relative to the PIR motion sensor. The angular position and the proximity can be used to identify a false alarm, estimate occupancy of a region, enable tracking of a target, and the like. In an example, the provided PIR motion sensor includes multiple PIR sensors and a Fresnel lens including lenslets configured to direct received IR radiation to at least two of the PIR sensors.

29 Claims, 9 Drawing Sheets

PYROELECTRIC IR MOTION SENSOR

BACKGROUND

Conventional pyroelectric infra-red (PIR) motion sensors, also known as passive infra-red motion sensors, can be used to sense mid-IR range radiation emitting from a person in the range of the PIR motion sensor.

BRIEF SUMMARY

This summary provides a basic understanding of some aspects of the present teachings. This summary is not exhaustive in detail, and is neither intended to identify all critical features, nor intended to limit the scope of the claims.

Methods and apparatus relating to a motion sensor are provided. Provided is an example method for determining a relative angular position of a target of a motion sensor. The method includes receiving PIR sensor array data, extracting angular position features from the PIR sensor array data, and identifying the relative angular position by applying a pattern matching algorithm to the angular position features. The PIR sensor array data can be a time series of data. The angular position features can include one or more of a peak position, an amplitude, or a polarity. The method can further include training the pattern matching algorithm with training data. In an example, the method can further include determining, from the PIR sensor array data, a normalized output magnitude across all PIR sensors, as well as comparing the relative angular position to a proximity lookup table to identify a proximity threshold, and comparing the normalized output magnitude to the proximity threshold to determine if the target is within a threshold distance, beyond a threshold distance, or at a threshold distance. The method can also include training the proximity lookup table with training data. In an example, the method can include, in response to identifying the target is within the threshold distance, initiating turning on one or more of a camera, a light, an alarm, or a combination thereof.

In a further example, provided is a non-transitory computer-readable medium, comprising processor-executable instructions stored thereon. The processor-executable instructions are configured to cause a processor to execute one or more parts of the aforementioned method. The non-transitory computer-readable medium can be integrated with a device, such as a security system.

In another example, provided is a first apparatus configured to determine a relative angular position of a target of a motion sensor. The first apparatus includes means for receiving PIR sensor array data, means for extracting angular position features from the PIR sensor array data, and means for identifying the relative angular position by applying a pattern matching algorithm to the angular position features. The PIR sensor array data can be a time series of data. The angular position features can include one or more of a peak position, an amplitude, or a polarity. The first apparatus can include means for training the pattern matching algorithm with training data. The first apparatus can also include means for determining, from the PIR sensor array data, a normalized output magnitude across all PIR sensors, as well as means for comparing the relative angular position to a proximity lookup table to identify a proximity threshold, and means for comparing the normalized output magnitude to the proximity threshold to determine if the target is within a threshold distance, beyond a threshold distance, or at a threshold distance. The first apparatus can include means for training the proximity lookup table with training data. In an example, the first apparatus can include means for initiating, in response to identifying the target is within the threshold distance, turning on one or more of a camera, a light, an alarm, or a combination thereof.

In another example, provided is a second apparatus. The second apparatus includes a processor and a memory coupled to the processor. The memory is configured to cause the processor to initiate receiving PIR sensor array data, to initiate extracting angular position features from the PIR sensor array data, and to initiate identifying the relative angular position by applying a pattern matching algorithm to the angular position features. The PIR sensor array data can be a time series of data. The angular position features can include one or more of a peak position, an amplitude, or a polarity. The memory can be further configured to cause the processor to initiate training the pattern matching algorithm with training data. The memory can be further configured to cause the processor to initiate determining, from the PIR sensor array data, a normalized output magnitude across all PIR sensors, to initiate comparing the relative angular position to a proximity lookup table to identify a proximity threshold, and to initiate comparing the normalized output magnitude to the proximity threshold to determine if the target is within a threshold distance, beyond a threshold distance, or at a threshold distance. The memory can be further configured to cause the processor to initiate training the proximity lookup table with training data. The memory can be further configured to cause the processor to initiate, in response to identifying the target is within the threshold distance, turning on one or more of a camera, a light, an alarm, or a combination thereof. The second apparatus can further include a security system coupled to the processor. The processor can be a microprocessor, a microcontroller, a digital signal processor, a field programmable gate array, a programmable logic device, an application-specific integrated circuit, a controller, a non-generic special-purpose processor, a state machine, a gated logic device, a discrete hardware component, a dedicated hardware finite state machine, or a combination thereof.

In another example, provided is a motion sensing device. The motion sensing device can include an array of PIR sensors, as well as a Fresnel lens including a plurality of lenslets. Two or more lenslets in the plurality of lenslets are configured to direct received IR radiation to at least two of the PIR sensors in the array of PIR sensors. The Fresnel lens can be asymmetric. The focal point of the Fresnel lens can be behind the array of PIR sensors. The array of PIR sensors can have at least a pair of PIR sensors separated from a third PIR sensor by a substantially similar distance. The array of PIR sensors can include at least two PIR sensors mounted such that the array of PIR sensors has a wider field of detection than the field of detection of a single constituent PIR sensor. The motion sensing device can include a security system coupled to the array of PIR sensors.

The foregoing broadly outlines some of the features and technical advantages of the present teachings so the detailed description and drawings can be better understood. Additional features and advantages are also described in the detailed description. The conception and disclosed examples can be used as a basis for modifying or designing other devices for carrying out the same purposes of the present teachings. Such equivalent constructions do not depart from the technology of the teachings as set forth in the claims. The inventive features characteristic of the teachings, together with further objects and advantages, are better understood from the detailed description and the accompanying drawings. Each of the drawings is provided for the purpose of illustration and description only, and does not limit the present teachings.

BRIEF DESCRIPTION OF THE DRAWINGS

The accompanying drawings, which are included to provide a further understanding of the disclosed subject matter, are incorporated in and constitute a part of this specification. The drawings also illustrate examples of the disclosed subject matter and together with the detailed description serve to explain the principles of examples of the disclosed subject matter. No attempt is made to show structural details in more detail than are necessary for a fundamental understanding of the disclosed subject matter and various ways in which the disclosed subject matter can be practiced.

Figure 1:
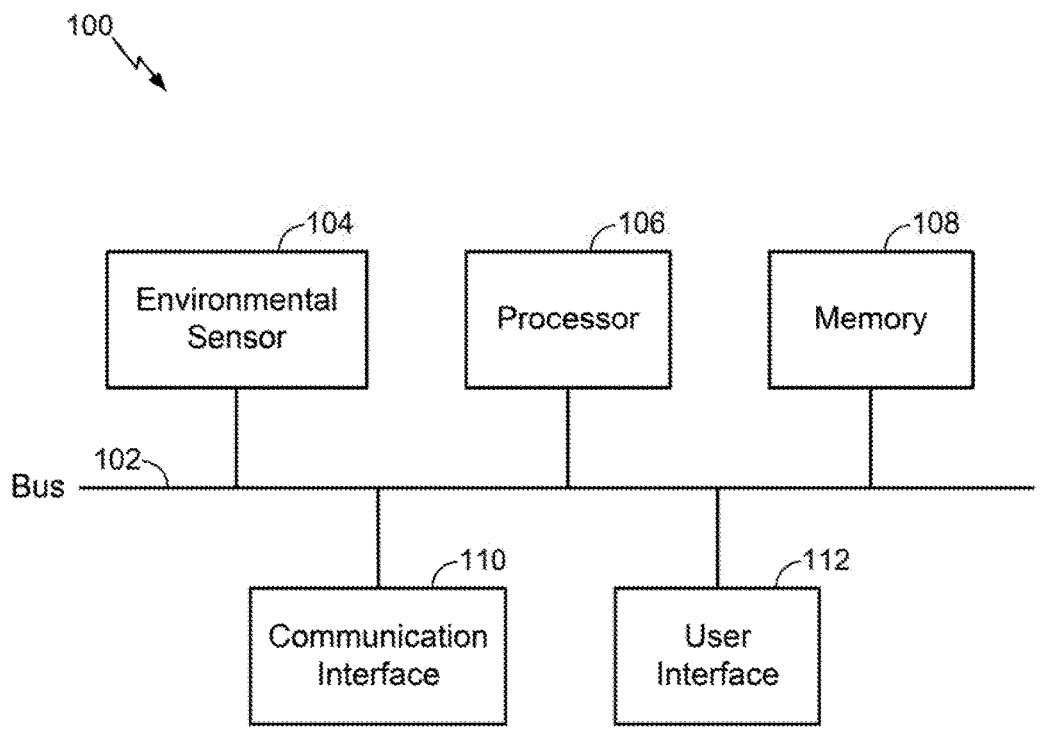
FIG. 1 shows an example sensor, according to an example of the disclosed subject matter.

In accordance with common practice, features depicted by the drawings may not be drawn to scale. Accordingly, dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Methods and apparatus relating to a PIR motion sensor are provided. The provided PIR motion sensor can be used to determine an angular position of a moving person relative to the PIR motion sensor. Further, the provided PIR motion sensor can be used to determine a proximity of a moving person relative to the PIR motion sensor. The angular position and the proximity can advantageously be used to identify a false alarm, estimate occupancy of a region, enable tracking of a target, the like, and combinations thereof. In an example, the provided PIR motion sensor includes multiple PIR sensors and a Fresnel lens including lenslets configured to direct received IR radiation to at least two of the constituent PIR sensors.

FIG. 1 shows an example sensor 100, which can include hardware in addition to the specific physical sensor which is configured to obtain information about the sensor's environment. The sensor 100 can include a bus 102 configured to enable data communication between couple major components of the sensor 100, such as an environmental sensor 104, a processor 106, a memory 108, a communication interface 110, an optional user interface 112, the like, or a combination thereof. One or more components of the sensor 100 can be implemented in a single physical arrangement, such as where multiple components are implemented on a single integrated circuit. The sensor 100 can include other components, and/or may not include all of the illustrative components shown.

The environmental sensor 104 can be a sensor as described herein (e.g., a PIR motion sensor 200 (See FIG. 2)), the like, or a combination thereof. The environmental sensor 104 obtains a corresponding type of information about the environment in which the environmental sensor 104 is located.

The processor 106 can receive and analyze data obtained by the environmental sensor 104, control operation of other components of the sensor 100, and process communication between the sensor 100 and other devices. The processor 106 can execute instructions stored in a memory 108. The processor 106 can be a general purpose processor, an Application Specific Integrated Circuit (ASIC), a microprocessor, a microcontroller, a digital signal processor, a field programmable gate array, a programmable logic device, an application-specific integrated circuit, a controller, a non-generic special-purpose processor, a state machine, a gated logic device, a discrete hardware component, a dedicated hardware finite state machine, or a combination thereof.

The memory 108 can store environmental data obtained by the environmental sensor 104. The memory 108 can also store instructions configured to cause the processor 106 to perform at a least a portion of a method described hereby. The memory 108 can be a Random Access Memory (RAM), a Read Only Memory (ROM), flash RAM, a computer-readable storage medium, the like, or a combination thereof.

A communication interface 110, such as a Wi-Fi or other wireless interface, Ethernet, or other local network interface, or the like can be configured to enable communication by the sensor 100 with other devices. The communication interface 110 can be configured to provide a connection to a remote device via a wired or wireless connection. The communication interface 110 can provide the connection using any suitable technique and protocol as will be readily understood by one of skill in the art, including digital cellular telephone, Wi-Fi, Bluetooth®, near-field communications (NFC), the like, or a combination thereof. For example, the communication interface 110 can enable the sensor 100 to communicate with a computer via one or more local, wide-area, or other communication networks, as described in further detail herein.

A user interface (UI) 112 can provide information to and/or receive input from a user of the sensor 100. The UI 112 can be configured to couple to one or more controllers. The UI 112 can be configured to couple to one or more user input devices, such as a keyboard, a mouse, a touch screen, the like, or a combination thereof. The UI 112 can include, for example, a speaker to output an audible alarm when an event is detected by the sensor 100. The UI 112 can include a light (e.g., a light-emitting diode) configured to be activated when an event is detected by the sensor 100. The UI 112 can have relatively minimal features (e.g., a limited-output display), or the UI 112 can be a full-featured interface (e.g., a touchscreen).

Figure 2:
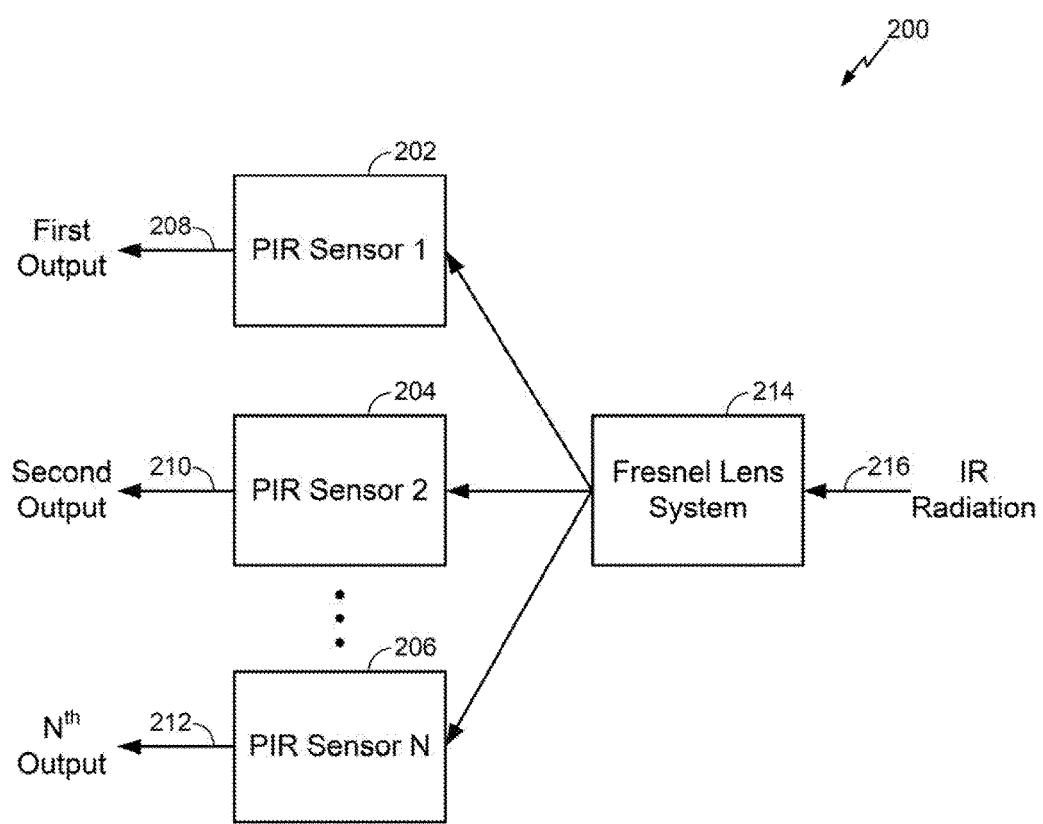
FIG. 2 shows a PIR motion sensor which is configured to detect incident IR radiation from a source and to provide multiple time-series outputs, according to an example of the disclosed subject matter.
Figure 3:
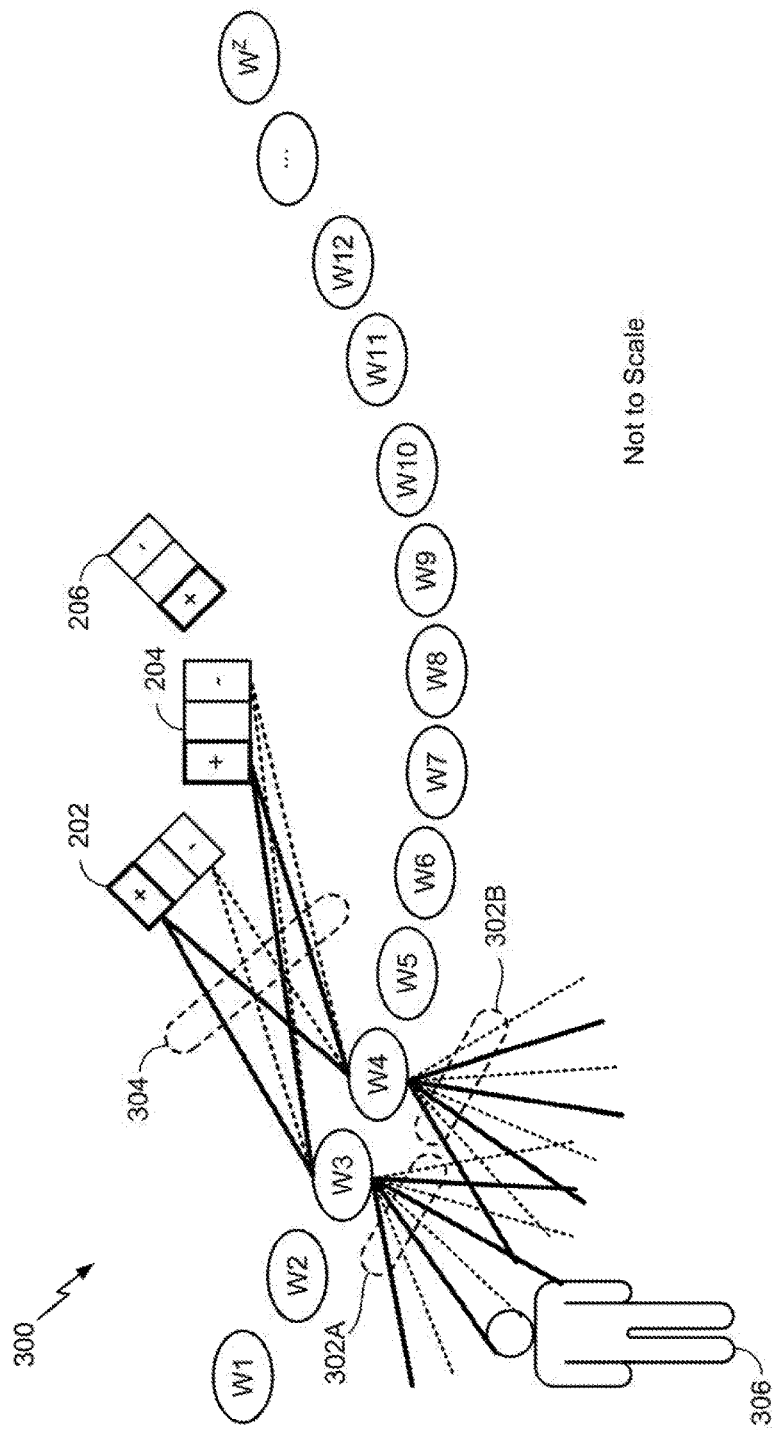
FIG. 3 shows an example PIR motion sensor having adjacent lenslets having overlapping respective detection zones, according to examples of the disclosed subject matter.
Figure 4:
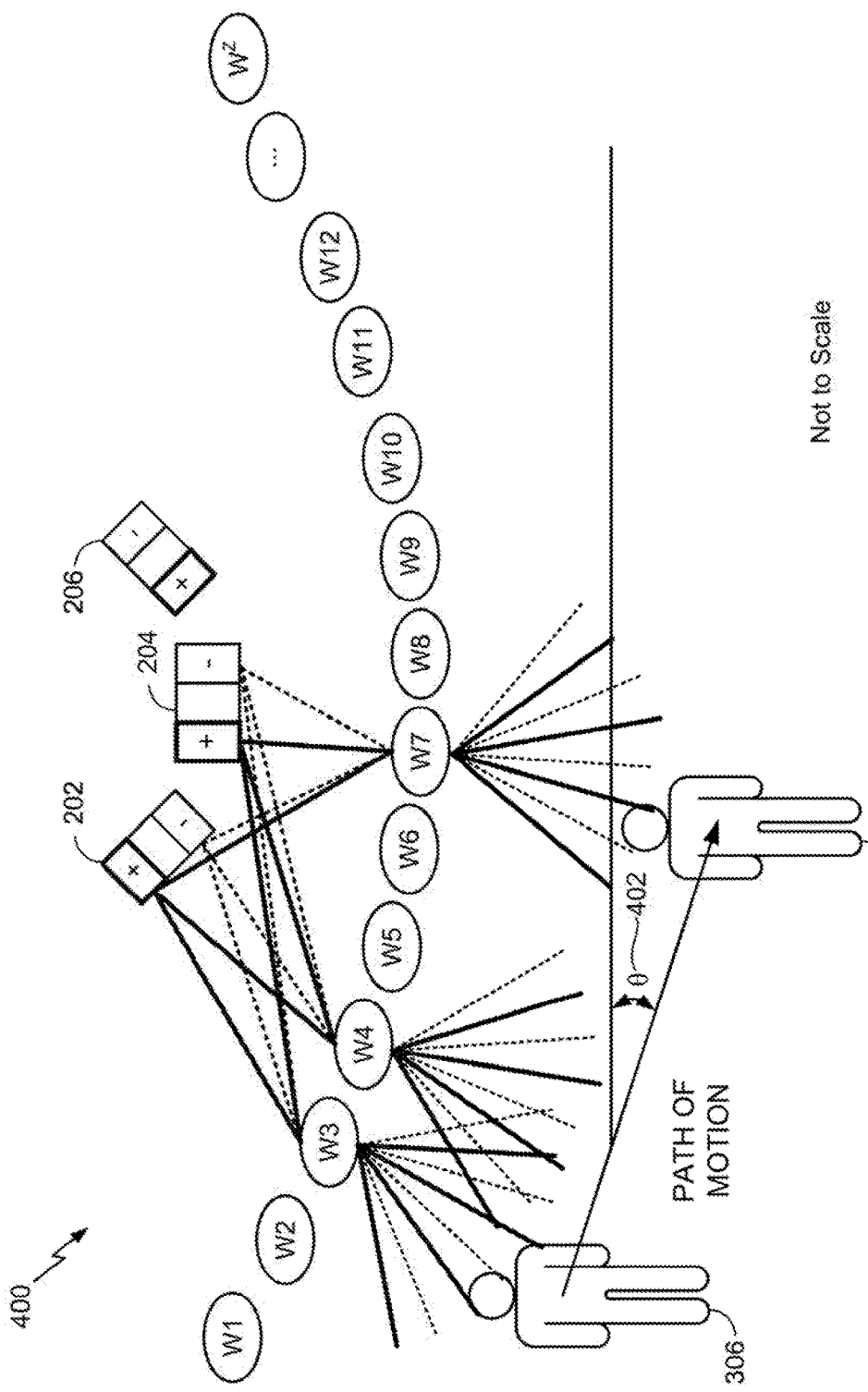
FIG. 4 shows an example PIR sensor array configured to produce an output from which an angular position of a source can be determined, according to an example of the disclosed subject matter.

FIGS. 2-4 depict the PIR motion sensor 200. The PIR motion sensor 200 is configured to detect incident IR radiation (e.g., from a moving source) and to provide a time-series output. The time-series output can be used to determine an angular position of the moving source relative to the PIR motion sensor 200, and can be used to determine a proximity of the moving source relative to the PIR motion sensor 200.

Referring to FIG. 2, the PIR motion sensor 200 can include an array of multiple PIR sensors, such as a first PIR sensor 202, a second PIR sensor 204, and through an "$N^{th}$" PIR sensor 206. Though only three PIR sensors are depicted in FIG. 2, the PIR motion sensor 200 can include any practicable number of PIR sensors. A larger number of PIR sensors increases a field of view (i.e. detection) of the motion sensor 200. The PIR motion sensor 200 can include PIR sensors separated by a substantially similar distance. The PIR motion sensor 200 can include PIR sensors having a similar angular orientation relative to each other. The PIR motion sensor 200 can include at least two PIR sensors mounted such that the PIR motion sensor 200 has a wider field of detection than the field of detection of a single constituent PIR sensor.

The first PIR sensor 202, the second PIR sensor 204, and through the $N^{th}$ PIR sensor 206 can be configured to detect IR radiation in a mid-band IR range. The mid-band IR range includes IR radiation having a wavelength between substantially six microns and substantially fourteen microns, and all ranges inclusive therein.

The PIR sensors detect a change in IR radiation, and can include a material configured to generate an electric charge when exposed to IR radiation. The quantity of charge generated is based on the quantity of incident IR radiation. The electric charge can be detected with a transistor and processed (e.g., amplified, compared, filtered, buffered, converted from an analog signal to a digital signal, compensated, the like, and/or combinations thereof). Thus, the first PIR sensor 202, the second PIR sensor 204, through the $N^{th}$ PIR sensor 206 can be dual-element PIR sensors configured to detect incident IR radiation while also suppressing an output due to temperature variations, background IR radiation, and the like. The PIR sensors can each have two IR sensing elements in a voltage-bucking arrangement. Thus, when no IR source is present, the PIR sensors detect ambient IR energy and mitigate effects due to the ambient IR energy, and provide a baseline output (e.g., substantially zero). When an IR source moves into range of a PIR sensor, the PIR sensor receives an increasing quantity of incident IR radiation and both generates and provides a corresponding positive output. When the IR source moves out of range of the PIR sensor, the PIR sensor receives a decreasing quantity of incident IR radiation and both generates and provides a corresponding negative output. The first PIR sensor 202 can be configured to generate a respective time-series first output 208 based on respectively received IR radiation. The second PIR sensor 204 can be configured to generate a respective time-series second output 210 based on respectively received IR radiation. The $N^{th}$ PIR sensor 206 can be configured to generate a respective time-series $N^{th}$ output 212 based on respectively received IR radiation. Each respective time-series output has angular position features such as a peak, an amplitude, and a polarity.

The PIR motion sensor 200 also includes one or more Fresnel lens 214 configured to direct received IR radiation 216 to the array of multiple PIR sensors. The Fresnel lens 214 can thus alter a respective field of view of the individual PIR sensors in the PIR motion sensor 200. The Fresnel lens 214 includes constituent lenslets. In a non-limiting example, there can be 6-18 lenslets. The PIR motion sensor 200 can have any practicable number of lenslets, and the lenslets can have any practicable shape. Each lenslet is configured to direct the received IR radiation 216 to at least two of the PIR sensors (e.g., the first PIR sensor 202, the second PIR sensor 204, through the $N^{th}$ PIR sensor 206). Directing the IR radiation to at least two of the PIR sensors (e.g., the first PIR sensor 202 and the second PIR sensor 204) ensures that a detected IR source produces at least one output (e.g., the respective time-series first output 208 and the respective time-series second output 210) during the time the IR source is in the detection range of the array of multiple PIR sensors. Thus, when the detected IR source is in the detection range and the detected IR source moves, at least one PIR sensor in the array of multiple PIR sensors produces an output during the time when the detected IR source is in range of the array of multiple PIR sensors. Directing the IR radiation to at least two of the PIR sensors also ensures a smooth transition (i.e., handoff) of detection from a first PIR sensor (e.g., the first PIR sensor 202) to a second PIR sensor (e.g., the second PIR sensor 204).

In examples, the lenslets in the Fresnel lens 214 are configured in a symmetrical pattern or an asymmetrical pattern. A symmetric configuration of lenslets substantially redirects substantially all incident radiation in a symmetric manner, and thus defines symmetric detection zones for the array of multiple PIR sensors. In contrast, an asymmetric configuration of lenslets redirects some incident radiation more than other incident radiation, and thus defines specific asymmetric detection zones for the array of multiple PIR sensors.

One or more respective focal point of the lenslets in the Fresnel lens 214 can be behind the array of multiple PIR sensors. When the respective focal point of a lenslet in the Fresnel lens 214 is behind the array of multiple PIR sensors, IR radiation incident on the array of multiple PIR sensors is out of focus (i.e., blurry). Directing partially out of focus IR radiation to the array of multiple PIR sensors and/or varying a thickness of the lenslet material can cause the respective PIR sensor outputs (e.g., the respective time-series first output 208, the respective time-series second output 210, the respective time-series $N^{th}$ output 212) to be smoother over time (i.e., sharp peaks in the outputs are reduced or eliminated). This reduces processing necessary to perform subsequent pattern matching on the output.

The lenslets can be configured to have a focal point substantially in a center of the array of multiple PIR sensors, in order to provide maximum availability of each of the PIR sensors. The lenslets can have a focal point substantially off-center of the array of multiple PIR sensors, for example, to accommodate a design need. In another example, the plurality of lenslets can have a focal point substantially behind a center of the array of multiple PIR sensors. The Fresnel lens 214 can be comprised of one or more of high-density polyethylene (HDPE) (e.g., thin-walled HDPE), germanium, a mid-IR transmissive material, a material transmissive to visible light, a translucent material, silicon, chalcogenide glass, the like, or a combination thereof.

FIGS. 3-4 depict an example arrangement 300 of the PIR motion sensor 200. Referring to FIG. 3, in the example arrangement 300, the lenslets in the Fresnel lens 214 are configured such that pair of adjacent lenslets (e.g., W3, W4, ... W$^z$ in FIG. 3) have overlapping respective detection zones 302A-302B. Thus, at least two lenslets (e.g., W3, W4) redirect IR radiation 304 emanating from an IR source 306 (e.g., a person) located within the range of the PIR motion sensor 200 to at least two different PIR sensors (e.g., the first PIR sensor 202, the second PIR sensor 204), which each receive different respective quantities of incident IR radiation 304 from each of the lenslets. Accordingly, the respective output of each of the at least two different PIR sensors is different. This difference in respective output signals from the at least two different PIR sensors can be used to determine a proximity of the IR source 306 relative to the PIR motion sensor 200, as described further with respect to FIG. 6. The PIR motion sensor 200 can have any practicable number of lenslets, and the lenslets can have any practicable shape. The shape and numbers of lenslets depicted in FIGS. 3-4 is illustrative, and not limiting. FIG. 3 is not drawn to scale, overlapping respective detection zones are not depicted in FIG. 3 for all PIR sensors, and FIG. 3 depicts a simplified flow of radiation through the Fresnel lens 214.

FIG. 4 depicts using the example arrangement 300 to produce an output from which an angular position 402 of the source 306 can be determined. The angular position 402 includes an angle determined relative to the PIR motion sensor 200. The source 306 of the IR radiation 304 must be moving, such as along a path 404, for the motion sensor 200 to generate sufficient output data to form a basis for determining the angular position 402. As the source 306 moves along the path 404, the first PIR sensor 202, the second PIR sensor 204, through the N$^{th}$ PIR sensor 206 each receive time-varying intensities of the IR radiation 304 emanating from the source 306. Thus, each of the first output 208, the second output 210, through the N$^{th}$ output 212 is a time-varying electrical output whose characteristics (e.g., amplitude, polarity, the like, and combinations thereof) depend on the intensity of the respective IR radiation 304 incident on the respective IR sensor, over time. FIG. 4 is not drawn to scale, overlapping respective detection zones are not depicted in FIG. 4 for all PIR sensors, and FIG. 4 depicts a generalized flow of radiation through the Fresnel lens 214.

Figure 5:
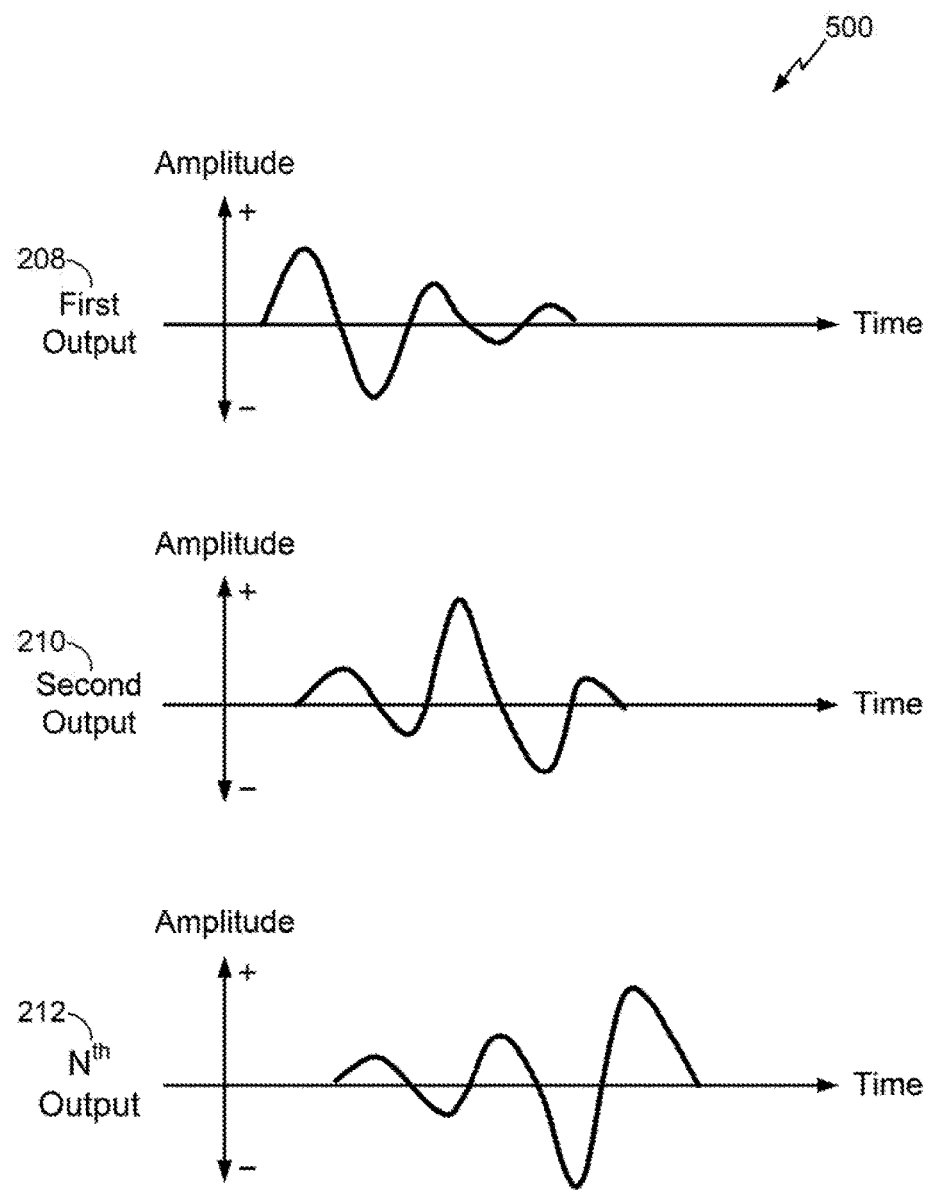
FIG. 5 shows example outputs of multiple PIR sensors over time, as an IR source moves, according to an example of the disclosed subject matter.

FIG. 5 depicts example outputs 500 of the first output 208, the second output 210, and the N$^{th}$ output 212 over time, as the source 306 moves along the path 404. Processing of the first output 208, the second output 210, through the N$^{th}$ output 212 is described in detail with respect to FIG. 6.

Figure 6:
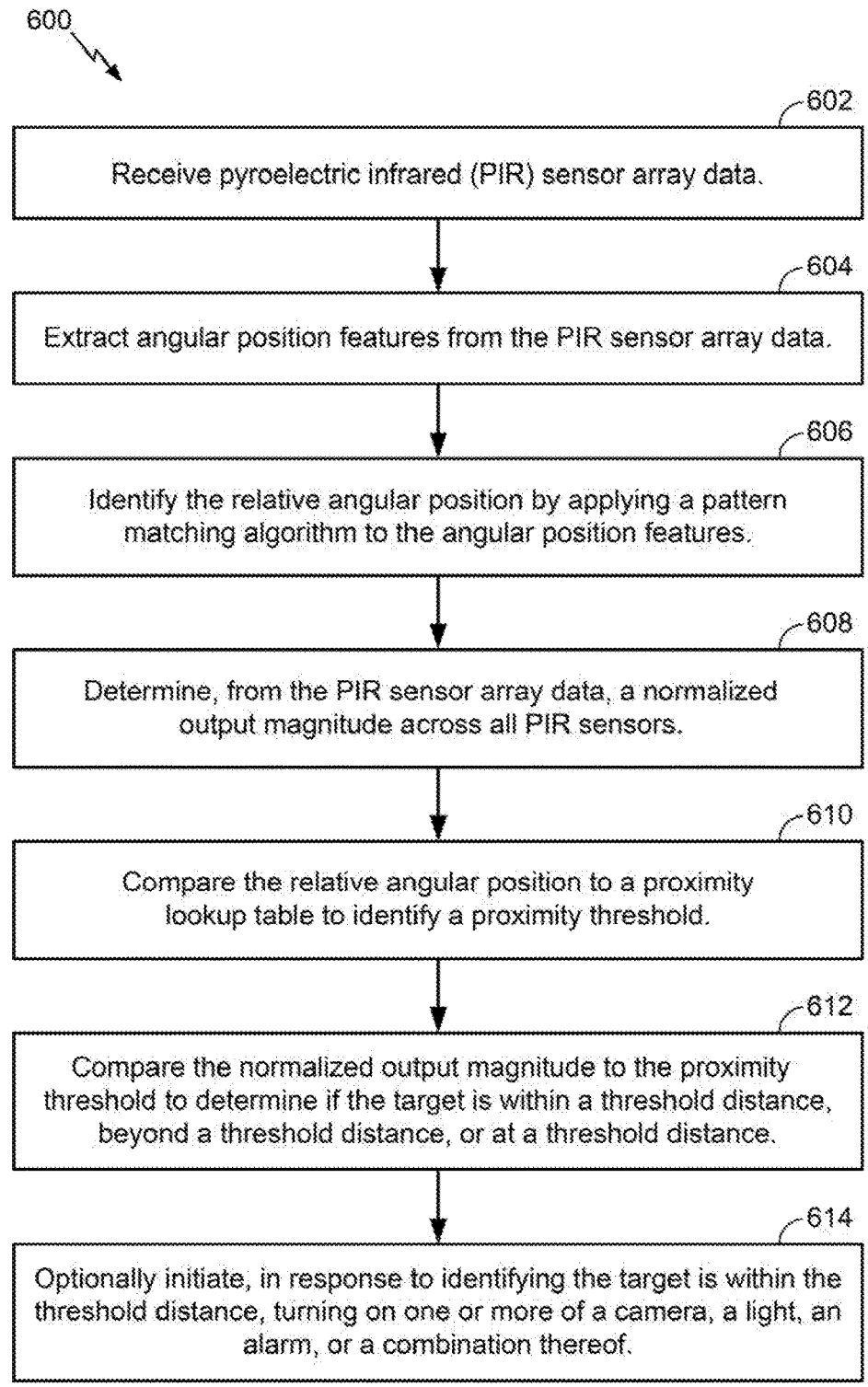
FIG. 6 shows a flowchart depicting a method for determining a relative angular position of a target of a motion sensor, according to an example of the disclosed subject matter.

FIG. 6 depicts a flowchart of a method 600 for determining a relative angular position of a target of a motion sensor. The method 600 can be performed at least in part by the processor 106, a controller 708, a remote system 710, a processor 804, a server 908, a remote platform 912, the like, or a combination thereof.

In block 602, PIR sensor array data is received. The PIR sensor array data can be a time series of data. The time-series of data can be analog data, digital data, or a combination thereof. For example, the PIR sensor array data can be the first output 208, the second output 210, through the N$^{th}$ output 212 received from the first PIR sensor 202, the second PIR sensor 204, through the N$^{th}$ PIR sensor 206.

In block 604, angular position features are extracted from the PIR sensor array data, for example, from respective outputs from multiple PIR sensors. The angular position features can include one or more peak position, one or more amplitude, one or more polarity, the like, or a combination thereof. The angular position features can be extracted over a fixed period of time post-initial detection.

In block 606, the relative angular position is identified by applying a pattern matching algorithm to the extracted angular position features. In an example, the pattern matching algorithm is a random forest classifier algorithm, a support vector machine-based pattern matching algorithm, a decision tree-based pattern matching algorithm, a neural network-based pattern matching algorithm, the like, etc. For example, the angular position 402 can be determined from the relative amplitudes of the first output 208, the second output 210, through the N$^{th}$ output 212 over time. The pattern matching algorithm can be stored in the memory 108. Optionally, the pattern matching algorithm can be trained with training data (e.g., which is stored in the memory 108) to calibrate the pattern matching algorithm. Calibration can also occur through machine-learning, at least in part as a result of analyzing the outputs of the PIR sensors over time. The calibrating can mitigate effects on PIR sensor output due to background IR, ambient temperature, sunlight, vibrations, source temperature, humidity, and noise addition from a processing circuit.

In block 608, a normalized output magnitude across all PIR sensors is determined from the PIR sensor array data. The normalization can be performed across PIR sensor output data from two or more PIR sensors. The proximity of the source 306 relative to the PIR motion sensor 200 can be determined by normalizing the respective amplitudes of the first output 208, the second output 210, through the N$^{th}$ output 212 and comparing the normalized amplitudes to at least one threshold amplitude. The threshold amplitude can be retrieved from a proximity lookup table.

In block 610, the relative angular position is compared to a proximity lookup table to identify a proximity threshold. The proximity lookup table can be stored in the memory 108. Optionally, the proximity lookup table is trained with training data (e.g., which is stored in the memory 108) to calibrate the proximity lookup table. Calibration can also occur through machine-learning, at least in part as a result of analyzing the outputs of the PIR sensors over time. The calibrating can mitigate effects on PIR sensor output due to background IR, ambient temperature, sunlight, vibrations, source temperature, humidity, and noise addition from a processing circuit.

In block 612, the normalized output magnitude is compared to the proximity threshold to determine if the target is within a threshold distance, beyond a threshold distance, or at a threshold distance. In a non-limiting example, the threshold distance can be two meters. For example, if the normalized output magnitude is greater than the proximity threshold, then the target is located closer to the motion sensor than the distance represented by the proximity threshold. Further, if the normalized output magnitude is less than the proximity threshold, then the target is located further from the motion sensor than the distance represented by the proximity threshold.

In optional block 614, one or more of a camera, a light, an alarm, or a combination thereof is turned on in response to identifying the target is within the threshold distance. In response to determining if the target is within a threshold distance, an output can be sent to a device (e.g., a camera, a light, an alarm, or a combination thereof) to inform the device of the status of the sensing by the motion sensor. A resolution of a distance measurement depends on a number of employed detectors and a configuration of the lens system. A number of proximity thresholds can be defined for a given angular position, giving levels of proximity (e.g., <3 feet, 3-6 feet, >6 feet). This data can be sent to the device as well.

Figure 7:
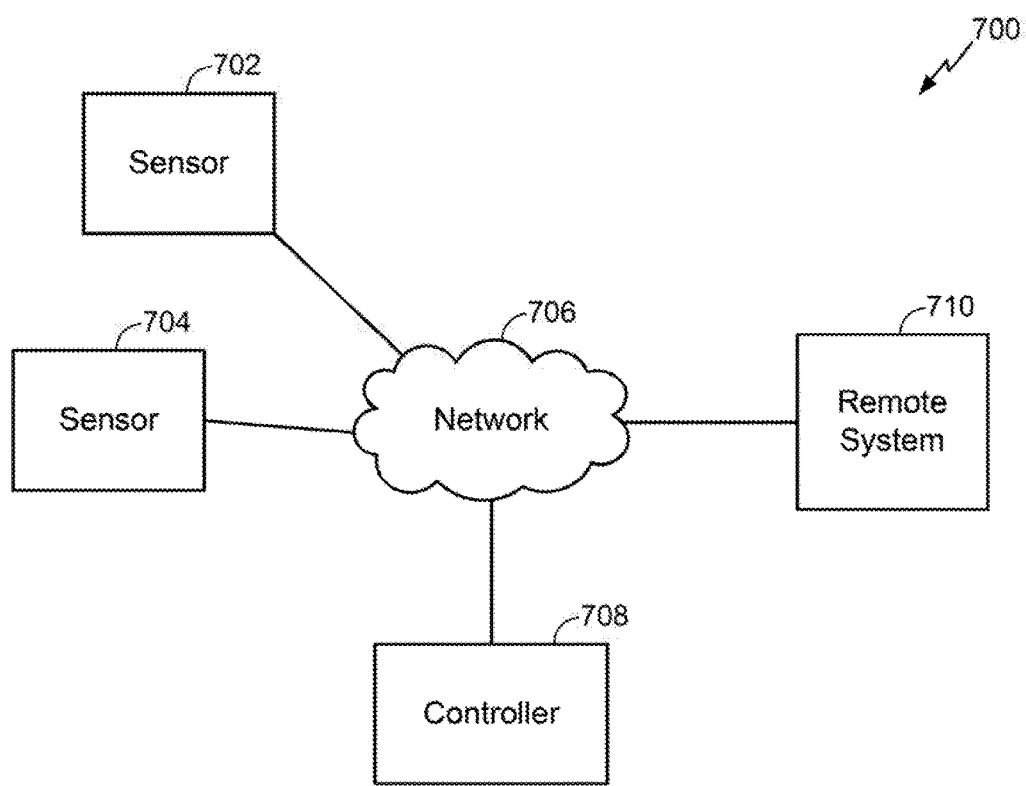
FIG. 7 shows an example of a sensor system, according to an example of the disclosed subject matter.

FIG. 7 shows an example of a sensor network 700, which can be implemented over any suitable wired and/or wireless communication networks. One or more sensors 702, 704 can communicate via a local network 706, such as a Wi-Fi or other suitable network, with each other and/or with the controller 708. The sensors 702, 704 can include the PIR motion sensor 200.

In general, a sensor, such as the sensors 702, 704, is any device that can obtain information about the sensor's environment. Sensors can be described by the type of information they collect. Sensor types can include motion, smoke, carbon monoxide, proximity, temperature, time, physical orientation, acceleration, location, entry, presence, pressure, light, sound, and the like. A sensor also can be described in terms of the particular physical device that obtains the environmental information. An accelerometer can obtain acceleration information, and thus can be used as a general motion sensor and/or an acceleration sensor. A sensor also can be described in terms of the specific hardware components used to implement the sensor. For example, a temperature sensor can include a thermistor, thermocouple, resistance temperature detector, integrated circuit temperature detector, or combinations thereof. A sensor also can be described in terms of a function or functions the sensor performs within the sensor network 700, such as a smart home environment. For example, a sensor can operate as a security sensor when the sensor is used to determine security events such as unauthorized entry. A sensor can operate with different functions at different times, such as where a motion sensor is used to control lighting in a smart home environment when an authorized user is present, and is used to alert to unauthorized or unexpected movement when no authorized user is present, or when an alarm system is in an armed state, or the like. In some cases, a sensor can operate as multiple sensor types sequentially or concurrently, such as where a temperature sensor is used to detect a change in temperature, as well as the presence of a person or animal. A sensor also can operate in different modes at the same or different times. For example, a sensor can be configured to operate in one mode during the day and another mode at night. As another example, a sensor can operate in different modes based upon a state of a home security system or a smart home environment, or as otherwise directed by such a system. A sensor can include multiple sensors or sub-sensors, such as where a position sensor includes both a global positioning sensor (GPS) as well as a wireless network sensor, which provides data that can be correlated with known wireless networks to obtain location information. Multiple sensors can be arranged in a single physical housing, such as where a single device includes movement, temperature, magnetic, and/or other sensors. Such a housing also can be referred to as a sensor or a sensor device. For clarity, sensors are described with respect to the particular functions they perform and/or the particular physical hardware used, when such specification is necessary for understanding of the examples disclosed hereby.

In some configurations, two or more sensors can generate data which can be used by a processor to generate a response and/or infer a state of an environment. For example, a motion sensor can determine a presence of a person in a room in which the motion sensor is located. A microphone can detect a sound above a set threshold, such as 60 dB. The processor can determine, based on the data generated by both sensors, that the processor should activate at least one of the lights in the room. In the event the processor only received data from the motion sensor, the processor may not have any basis to alter the state of the lighting in the room. Similarly, if the processor only received data from the microphone, it may not make sense to activate the lights in the room because it is daytime or bright in the room (e.g., the lights are already on). As another example, two or more sensors can communicate with one another. Thus, data generated by multiple sensors simultaneously or nearly simultaneously can be used to determine a state of an environment and, based on the determined state, generate a response.

Data generated by one or more sensors can indicate patterns in the behavior of one or more users and/or an environment state over time, and thus can be used to "learn" such characteristics. For example, data generated by an ambient light sensor in a room and the time of day can be stored in a local or remote storage medium. A processor in communication with the storage medium can compute a behavior based on the data generated by the light sensor. The light sensor data can indicate that the amount of light detected increases until an approximate time or time period, such as 3:30 PM, and then declines until another approximate time or time period, such as 5:30 PM, at which time there an abrupt increase in the amount of light is detected. In many cases, the amount of light detected after the second time period can be either below a dark level of light (e.g., under or equal to 60 lux) or bright (e.g., equal to or above 400 lux). In this example, the data can indicate that after 5:30 PM, an occupant is turning on/off a light as the occupant of the room in which the sensor is located enters/leaves the room. At other times, the light sensor data can indicate that no lights are turned on/off in the room. The system, therefore, can learn that occupants patterns of turning on and off lights, and can generate a response to the learned behavior. For example, at 5:30 PM, a smart home environment or other sensor network can automatically activate the lights in the room if the smart home environment or the other sensor network detects an occupant in proximity to the home. In some examples, such behavior patterns can be verified using other sensors (e.g., a motion sensor). Continuing the example, user behavior regarding specific lights can be verified and/or further refined based upon states of, or data gathered by, smart switches, outlets, lamps, motion sensors, and the like.

Sensors can communicate via a communication network, such as a conventional wireless network, and/or a sensor-specific network through which sensors can communicate with one another and/or with dedicated other devices. In some configurations one or more sensors can provide information to one or more other sensors, to a central controller, or to any other device capable of communicating on a network with the one or more sensors. A central controller can be general- or special-purpose. For example, one type of central controller is a home automation network, which collects and analyzes data from one or more sensors within the home. Another example of a central controller is a special-purpose controller which is dedicated to a subset of functions, such as a security controller which collects and analyzes sensor data primarily or exclusively as the sensor data relates to various security considerations for a location. A central controller can be located locally with respect to the sensors with which the central controller communicates and from which the central controller obtains sensor data, such as in the case where the central controller is positioned within a home that includes a home automation and/or sensor network. Alternatively or in addition, a central controller can be remote from the sensors, such as where the central controller is implemented as a cloud-based system which communicates with multiple sensors, which can be located at multiple locations and can be local or remote with respect to one another.

The controller 708 can be a general- or special-purpose computer. The controller can, for example, receive, aggregate, and/or analyze environmental information received from the sensors 702, 704. The sensors 702, 704 and the controller 708 can be located locally to one another, such as within a single dwelling, office space, building, room, or the like, or they can be remote from each other, such as where the controller 708 is implemented in the remote system 710 such as a cloud-based reporting and/or analysis system. Alternatively or in addition, sensors can communicate directly with the remote system 710. The remote system 710 can, for example, aggregate data from multiple locations, provide instructions, provide software updates, and/or provide aggregated data to the controller 708 and/or the sensors 702, 704. In an example, the remote system 710 is a security system.

The sensor network 700 can be implemented in a smart-home environment. The smart-home environment can include a structure, a house, office building, garage, mobile home, or the like. Devices in the smart home environment, such as the sensors 702, 704, the controller 708, and the network 706 can be integrated into a smart-home environment that does not include an entire structure, such as an apartment, a condominium, an office space, the like, or combinations thereof. The smart home environment can control and/or be coupled to devices outside of the structure. For example, one or more of the sensors 702, 704 can be located outside the structure, for example, at one or more distances from the structure. One or more of the devices in the smart home environment need not be located within the structure. For example, the controller 708, which can receive input from the sensors 702, 704, can be located outside of the structure. The structure can include a plurality of rooms, separated at least partly from each other via walls. The walls can include interior walls or exterior walls. Each room can further include a floor and a ceiling. Devices, such as the sensors 702, 704, can be mounted on, integrated with, and/or supported by a wall, floor, or ceiling of the structure.

The sensor network 700 can include a plurality of devices, including intelligent, multi-sensing, network-connected devices, which can integrate seamlessly with each other and/or with a central server or a cloud-computing system (e.g., the controller 708 and/or the remote system 710) to provide home-security and smart-home features. The smart-home environment can include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells can be the sensors 702, 704 shown in FIG. 7.

As another example, a smart doorbell (e.g., including a motion sensor) can control doorbell functionality, detect a person's approach to or departure from a location (e.g., an outer door to the structure), and announce a person's approach or departure from the structure via audible and/or visual message output by a speaker and/or a display coupled to, for example, the controller 708.

In some examples, the sensor network 700 can include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs can be or include one or more of the sensors 702, 704 shown in FIG. 7. A smart wall switch can detect ambient lighting conditions, and control a power and/or dim state of one or more lights. For example, a sensor such as sensors 702, 704, can detect ambient lighting conditions, and a device such as the controller 708 can control the power to one or more lights (not shown) in the smart-home environment. Smart wall switches can also control a power state or speed of a fan, such as a ceiling fan. For example, sensors 702, 704 can detect the power and/or speed of a fan, and the controller 708 can adjust the power and/or speed of the fan, accordingly. Smart wall plugs can control supply of power to one or more wall plugs (e.g., such that power is not supplied to the plug if nobody is detected to be within the smart-home environment). For example, one of the smart wall plugs can control supply of power to a lamp (not shown).

In examples, a smart-home environment can include one or more intelligent, multi-sensing, network-connected entry detectors (e.g., a "smart entry detector," a motion sensor). Such detectors can be or include one or more of the sensors 702, 704 shown in FIG. 7. The illustrated smart entry detectors (e.g., sensors 702, 704) can be located at one or more windows, doors, and other entry points of the smart-home environment for detecting when a window, door, or other entry point is opened, broken, breached, and/or compromised. The smart entry detectors can be configured to generate a corresponding signal to be provided to the controller 708 and/or the remote system 710 when a window or door is opened, closed, breached, and/or compromised. In some examples, the alarm system, which can be included with the controller 708 and/or coupled to the network 706, may not arm unless all smart entry detectors (e.g., sensors 702, 704) indicate that all doors, windows, entryways, and the like are closed and/or that all smart entry detectors are armed.

The smart doorbells, the smart wall switches, the smart wall plugs, the smart entry detectors, the keypads, and other devices of a smart-home environment (e.g., as illustrated as sensors 702, 704 of FIG. 7) can be communicatively coupled to each other via the network 707, and to the controller 708 and/or the remote system 710 to provide security, safety, and/or comfort for a user in the smart home environment.

A user can interact with one or more of the network-connected smart devices (e.g., via the network 706). For example, a user can communicate with one or more of the network-connected smart devices using a computer (e.g., a desktop computer, laptop computer, tablet, or the like) or other portable electronic device (e.g., a smartphone, a tablet, a key fob, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key fobs with the smart-home environment (e.g., with the controller 708). Such registration can be made at a central server (e.g., the controller 708 and/or the remote system 710) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user can also use their registered electronic device to control the network-connected smart devices when the user is located inside the smart-home environment.

Alternatively, or in addition to registering electronic devices, the smart-home environment can make inferences about which individuals live in the home and are therefore users and which electronic devices are associated with those individuals. As such, the smart-home environment can "learn" who is a user (e.g., an authorized user) and permit the electronic devices associated with those individuals to control the network-connected smart devices of the smart-home environment (e.g., devices communicatively coupled to the network 706), in some examples including sensors used by or within the smart-home environment. Various types of notices and other information can be provided to users via messages sent to one or more user electronic devices. For example, the messages can be sent via email, short message service (SMS), multimedia messaging service (MMS), unstructured supplementary service data (USSD), the like, any other practicable type of messaging services and/or communication protocols, or a combination thereof.

A smart-home environment can communicate with devices outside of the smart-home environment, but within a proximate geographical range of the home. For example, the smart-home environment can include an outdoor lighting system (not shown) configured to communicate information through the communication network 706 or directly to a central server or cloud-computing system (e.g., the controller 708 and/or the remote system 710) regarding detected movement and/or presence of people, animals, and any other objects; and configured to receive commands for controlling the lighting accordingly.

The controller 708 and/or the remote system 710 can be configured to control the outdoor lighting system based on information received from the other network-connected smart devices in the smart-home environment. For example, in the event any of the network-connected smart devices, such as smart wall plugs located outdoors, detect movement at night time, the controller 708 and/or the remote system 710 can activate the outdoor lighting system and/or other lights in the smart-home environment.

In some configurations, the remote system 710 can be configured to aggregate data from multiple locations, such as multiple buildings, multi-resident buildings, and individual residences within a neighborhood, multiple neighborhoods, and the like. In general, multiple controllers 708 can be configured to provide information to the remote system 710. The multiple controllers 708 can be configured to provide data directly from one or more sensors as previously described, or the data can be aggregated and/or analyzed by local controllers such as the controller 708, which then communicates with the remote system 710. The remote system can be configured to aggregate and analyze the data from multiple locations, and can be configured to provide aggregate results to each location. For example, the remote system 710 can be configured to examine larger regions for common sensor data or trends in sensor data, and provide information on the identified commonality or environmental data trends to each of the multiple controllers 708.

Figure 8:
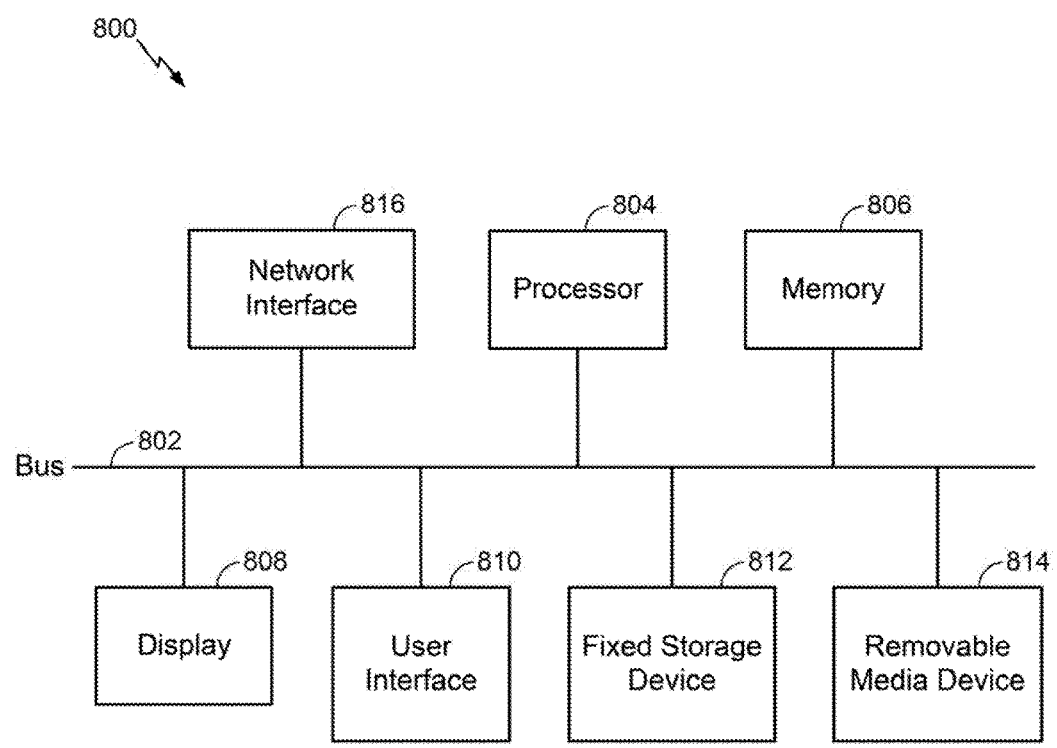
FIG. 8 shows a computing device, according to an example of the disclosed subject matter.

FIG. 8 depicts an example computing device 800 configured to implement examples of the disclosed subject matter. The device 800 can be configured as a control device (e.g., as the controller 708, the remote system 710, the like, or a combination thereof). The device 800 can be configured as a device including sensors (e.g., the sensors 702, 704). Alternatively or in addition, the device 800 can be, for example, a desktop or laptop computer, or a mobile computing device such as a smart phone, tablet, or the like. The device 800 can include a bus 802 configured to enable data communication between couple major components of the device 800, such as the processor 804, a memory 806, a display 808 such as a display screen, a user interface 810, a fixed storage device 812, a removable media device 814, a network interface 816, the like, or a combination thereof.

The processor 804 can be a general purpose processor, an ASIC, a microprocessor, a microcontroller, a digital signal processor, a field programmable gate array, a programmable logic device, an application-specific integrated circuit, a controller, a non-generic special-purpose processor, a state machine, a gated logic device, a discrete hardware component, a dedicated hardware finite state machine, or a combination thereof. In an example, the processor 804 can be configured in a manner similar to, or identical to, the processor 106.

The memory 806 can be a RAM, a ROM, flash RAM, a computer-readable storage medium, the like, or a combination thereof.

The user interface 810 can be configured to couple to one or more controllers. The user interface 810 can be configured to couple to one or more user input devices, such as a keyboard, a mouse, a touch screen, the like, or a combination thereof.

The fixed storage device 812 can be a hard drive, a flash memory device, the like, or a combination thereof. The fixed storage device 812 can be integral with the device 800 or can be separate and accessed through an interface.

The removable media device 814 can be an optical disk, flash drive, the like, or a combination thereof.

The network interface 816 can be configured to communicate with one or more remote devices (e.g., sensors such as the sensors 702, 704) via a suitable network connection. The network interface 816 can be configured to provide a connection to a remote server via a wired or wireless connection. The network interface 816 can provide the connection using any suitable technique and protocol as will be readily understood by one of skill in the art, including digital cellular telephone, Wi-Fi, Bluetooth®, NFC, the like, or a combination thereof. For example, the network interface 816 can allow the device to communicate with other computers via one or more local, wide-area, or other communication networks, as described in further detail herein.

Figure 9:
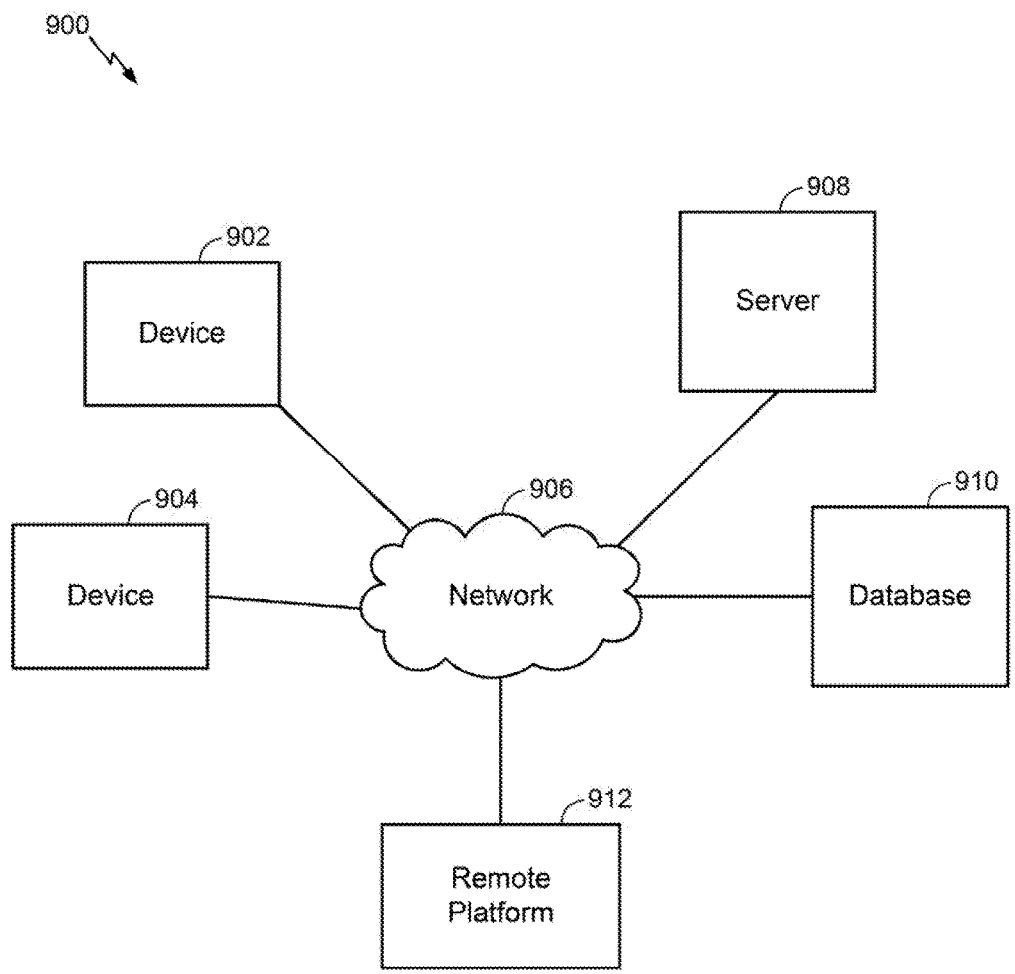
FIG. 9 shows an example network, according to an example of the disclosed subject matter.

FIG. 9 shows an example network 900. The network 900 can include one or more devices 902, 904. The devices 902, 904 can be as a computer, a computing device, a smart phone, a tablet computing device, the like, or a combination thereof. The devices 902, 904 can couple to other devices via one or more networks 906. The network 906 can be a local network, wide-area network, the Internet, or any other suitable communication network or networks. The network 906 can be implemented on any suitable platform including wired and/or wireless networks. The devices 902, 904 can communicate with one or more remote devices, such as the server 908 and/or a database 910. The remote devices, such as a server 908 and/or a database 910 can be directly accessible by the devices 902, 904, or one or more other devices can provide intermediary access such as where the server 908 provides access to resources stored in the database 910. The devices 902, 904 also can access the remote platform 912 or services provided by the remote platform 912 such as cloud computing arrangements and services. The remote platform 912 can include the servers 908 and/or the database 910.

The term "example" can mean "serving as an example, instance, or illustration." Any example described as "example" is not necessarily to be construed as preferred over other examples. Likewise, the term "examples" does not require that all examples include the described feature, advantage, or operation. Use of the terms "in one example," "an example," and the like does not necessarily refer to the same example. Use of the terms "in one feature," "a feature," and the like does not necessarily refer to the same feature. Furthermore, a particular feature can be combined with one or more other features. Moreover, a particular structure can be combined with one or more other structures. At least a portion of the apparatus described hereby can be configured to perform at least a portion of a method described hereby.

The terms "connected," "coupled," and variations thereof, mean any connection or coupling between elements, either direct or indirect, and can include an intermediate element between two elements that are "connected" or "coupled" together via the intermediate element. Coupling and connection between the elements can be physical, logical, or a combination thereof. Elements can be "connected" or "coupled" together, for example, by one or more wires, cables, printed electrical connections, electromagnetic energy, the like, or a combination thereof. The electromagnetic energy can have a wavelength at a radio frequency, a microwave frequency, a visible optical frequency, an invisible optical frequency, the like, or a combination thereof, as is practicable. These are non-limiting and non-exhaustive examples.

The term "signal" can include any signal such as a data signal, an audio signal, a video signal, a multimedia signal, an analog signal, a digital signal, the like, or a combination thereof. Information and signals can be represented using any of a variety of different technologies and techniques. For example, data, an instruction, a process step, a process block, a command, information, a signal, a bit, a symbol, the like, and combinations thereof can be represented by a voltage, a current, an electromagnetic wave, a magnetic field, a magnetic particle, an optical field, an optical particle, the like, or any practical combination thereof, depending at least in part on the particular application, at least in part on a desired design, at least in part on corresponding technology, at least in part on like factors, or a combination thereof.

An element referred to as "first," "second," and so forth does not limit either the quantity or the order of those elements. Rather, these designations are used as a convenient method of distinguishing between two or more elements or instances of an element. Thus, a reference to first and second elements does not mean that only two elements can be employed, or the first element must necessarily precede the second element. Also, unless stated otherwise, a set of elements can comprise one or more elements. In addition, terminology of the form "at least one of: A, B, or C" or "one or more of A, B, or C" or "at least one of a group consisting of A, B, and C" can be interpreted as "A or B or C or any combination of these elements." For example, this terminology can include A, or B, or C, or A and B, or A and C, or A and B and C, or 2A, or 2B, or 2C, and so on.

The terminology used herein describes particular examples and is not intended to be limiting. The singular forms "a," "an," and "the" include the plural forms as well, unless the context clearly indicates otherwise. In other words, the singular portends the plural, where practicable. Further, the terms "comprises," "comprising," "includes," and "including" specify a presence of a feature, an integer, a step, a block, an operation, an element, a component, the like, or a combination thereof, but do not necessarily preclude a presence or an addition of another feature, integer, step, block, operation, element, component, and the like.

Further, the example logical blocks, modules, circuits, steps, and the like, as described in the examples disclosed hereby, can be implemented as electronic hardware, computer software, or combinations of both, as is practicable. To clearly illustrate this interchangeability of hardware and software, example components, blocks, modules, circuits, and steps are described herein generally in terms of their functionality. Whether the functionality is implemented as hardware or software depends upon the particular application and design constraints imposed on an overall system. Skilled artisans can implement the described functionality in a manner tailored to a particular application. An implementation should not be interpreted as causing a departure from the scope of the present disclosure.

One or more examples provided hereby can include a non-transitory (i.e., a non-transient) machine-readable media and/or a non-transitory (i.e., a non-transient) computer-readable media storing processor-executable instructions (e.g., special programming) configured to cause a processor (e.g., a special-purpose processor) to transform the processor and any other cooperating devices into a machine (e.g., a special-purpose processor) configured to perform at least a part of a function described hereby and/or a method described hereby. Performing at least a part of a function described hereby can include initiating at least a part of a function described hereby. When implemented on a general-purpose processor, the processor-executable instructions can configure the processor to become a special-purpose device, such as by temporary (and/or permanent) creation of specific logic circuits within the processor, as specified by the instructions. In an example, a combination of at least two related method steps forms a sufficient algorithm. In an example, a sufficient algorithm constitutes special programming. In an example, any software that can cause a computer (e.g., a general-purpose computer, a special-purpose computer, etc.) to be configured to perform one or more function, feature, step algorithm, block, or combination thereof, constitutes special programming. A non-transitory (i.e., a non-transient) machine-readable media specifically excludes a transitory propagating signal. A non-transitory (i.e., a non-transient) machine-readable medium can include a hard drive, a universal serial bus drive, a RAM, a flash memory, a ROM, an erasable programmable read-only memory (EPROM), an electrically erasable programmable read-only memory (EEPROM), a register, a hard disk drive, a removable disk, a compact disc read-only memory (CD-ROM), the like. An example storage medium can be coupled to the processor such that the processor can read information from, and/or write information to, the storage medium. In an example, the non-transitory machine-readable medium can be integrated with a processor.

Further, examples are described in terms of sequences of actions to be performed by, for example, one or more element of a computing device, such as a processor. Examples can be implemented using hardware that can include a processor, such as a general purpose processor and/or an ASIC. Both a general purpose processor and an ASIC can be configured to initiate and/or perform at least a part of the disclosed subject matter. The processor can be coupled to a memory, such as a RAM, a flash memory, a ROM, an EPROM, an EEPROM, the like, or any other device capable of storing electronic information, such as a processor-executable instruction.

Nothing stated or depicted in this application is intended to dedicate any component, step, block, feature, object, benefit, advantage, or equivalent to the public, regardless of whether the component, step, block, feature, object, benefit, advantage, or the equivalent is recited in the claims. This description, for purpose of explanation, includes references to specific examples. However, the illustrative discussions herein (including in the claims) are not intended to be exhaustive or to limit examples of the disclosed subject matter to the precise forms disclosed. Many modifications and variations are possible in view of the teachings herein. The examples are chosen and described in order to explain the principles of examples of the disclosed subject matter and their practical applications, to thereby enable persons skilled in the art to utilize those examples as well as various examples with various modifications as may be suited to the particular use contemplated.

The invention claimed is:

1. A motion sensing device, comprising:
an array of pyroelectric IR (PIR) sensors; and
a Fresnel lens including a plurality of lenslets, wherein two or more lenslets are each configured to direct received IR (IR) radiation to at least two of the PIR sensors in the array of PIR sensors.

2. The motion sensing device of claim 1, wherein the plurality of lenslets are configured in an asymmetric pattern.

3. The motion sensing device of claim 1, wherein the focal point of the Fresnel lens is behind the array of PIR sensors.

4. The motion sensing device of claim 1, wherein the array of PIR sensors has at least a pair of PIR sensors separated from a third PIR sensor by a substantially similar distance.

5. The motion sensing device of claim 1, wherein the array of PIR sensors includes at least two PIR sensors mounted such that the array of PIR sensors has a wider field of detection than the field of detection of a single constituent PIR sensor.

6. The motion sensing device of claim 1, further comprising a security system coupled to the array of PIR sensors.

7. A non-transitory computer-readable medium, comprising:
instructions stored by the non-transitory computer-readable medium, wherein the instructions are configured to cause a processor to:
initiate receiving pyroelectric IR (PIR) sensor array data;
initiate extracting angular position features from the PIR sensor array data; and
initiate identifying the relative angular position by applying a pattern matching algorithm to the angular position features.

8. The non-transitory computer-readable medium of claim 7, wherein the PIR sensor array data is a time series of data.

9. The non-transitory computer-readable medium of claim 7, wherein the angular position features include one or more of a peak position, an amplitude, or a polarity.

10. The non-transitory computer-readable medium of claim 7, wherein the instructions are configured to cause the processor to initiate training the pattern matching algorithm with training data.

11. The non-transitory computer-readable medium of claim 7, wherein the instructions are configured to cause the processor to:
initiate determining, from the PIR sensor array data, a normalized output magnitude across all PIR sensors;
initiate comparing the relative angular position to a proximity lookup table to identify a proximity threshold; and
initiate comparing the normalized output magnitude to the proximity threshold to determine if the target is within a threshold distance, beyond a threshold distance, or at a threshold distance.

12. The non-transitory computer-readable medium of claim 11, wherein the instructions are configured to cause the processor to initiate training the proximity lookup table with training data.

13. The non-transitory computer-readable medium of claim 11, wherein the instructions are configured to cause the processor to initiate, in response to identifying the target is within the threshold distance, initiating turning on one or more of a camera, a light, an alarm, or a combination thereof.

14. An apparatus, comprising:
a processor; and
a memory coupled to the processor and configured to cause the processor to:
initiate receiving pyroelectric IR (PIR) sensor array data;
initiate extracting angular position features from the PIR sensor array data; and
initiate identifying the relative angular position by applying a pattern matching algorithm to the angular position features.

15. The apparatus of claim 14, wherein the PIR sensor array data is a time series of data.

16. The apparatus of claim 14, wherein the angular position features include one or more of a peak position, an amplitude, or a polarity.

17. The apparatus of claim 14, wherein the memory is further configured to cause the processor to initiate training the pattern matching algorithm with training data.

18. The apparatus of claim 14, wherein the memory is further configured to cause the processor to:
initiate determining, from the PIR sensor array data, a normalized output magnitude across all PIR sensors;
initiate comparing the relative angular position to a proximity lookup table to identify a proximity threshold; and
initiate comparing the normalized output magnitude to the proximity threshold to determine if the target is within a threshold distance, beyond a threshold distance, or at a threshold distance.

19. The apparatus of claim 18, wherein the memory is further configured to cause the processor to initiate training the proximity lookup table with training data.

20. The apparatus of claim 18, wherein the memory is further configured to cause the processor to initiate, in response to identifying the target is within the threshold distance, turning on one or more of a camera, a light, an alarm, or a combination thereof.

21. The apparatus of claim 14, further comprising a security system coupled to the processor.

22. The apparatus of claim 14, wherein the processor is a microprocessor, a microcontroller, a digital signal processor, a field programmable gate array, a programmable logic device, an application-specific integrated circuit, a controller, a non-generic special-purpose processor, a state machine, a gated logic device, a discrete hardware component, a dedicated hardware finite state machine, or a combination thereof.

23. A method for determining a relative angular position of a target of a motion sensor, comprising:
receiving pyroelectric IR (PIR) sensor array data;
extracting angular position features from the PIR sensor array data; and
identifying the relative angular position by applying a pattern matching algorithm to the angular position features.

24. The method of claim 23, wherein the PIR sensor array data is a time series of data.

25. The method of claim 23, wherein the angular position features include one or more of a peak position, an amplitude, or a polarity.

26. The method of claim 23, further comprising training the pattern matching algorithm with training data.

27. The method of claim 23, further comprising:
determining, from the PIR sensor array data, a normalized output magnitude across all PIR sensors;
comparing the relative angular position to a proximity lookup table to identify a proximity threshold; and
comparing the normalized output magnitude to the proximity threshold to determine if the target is within a threshold distance, beyond a threshold distance, or at a threshold distance.

28. The method of claim 27, further comprising training the proximity lookup table with training data.

29. The method of claim 27, further comprising, in response to identifying the target is within the threshold distance, initiating turning on one or more of a camera, a light, an alarm, or a combination thereof.

* * * * *